Jan. 13, 1959  N. A. SARGENT ET AL  2,868,280
METHOD FOR PRODUCING AEROGELS
Filed Nov. 25, 1953
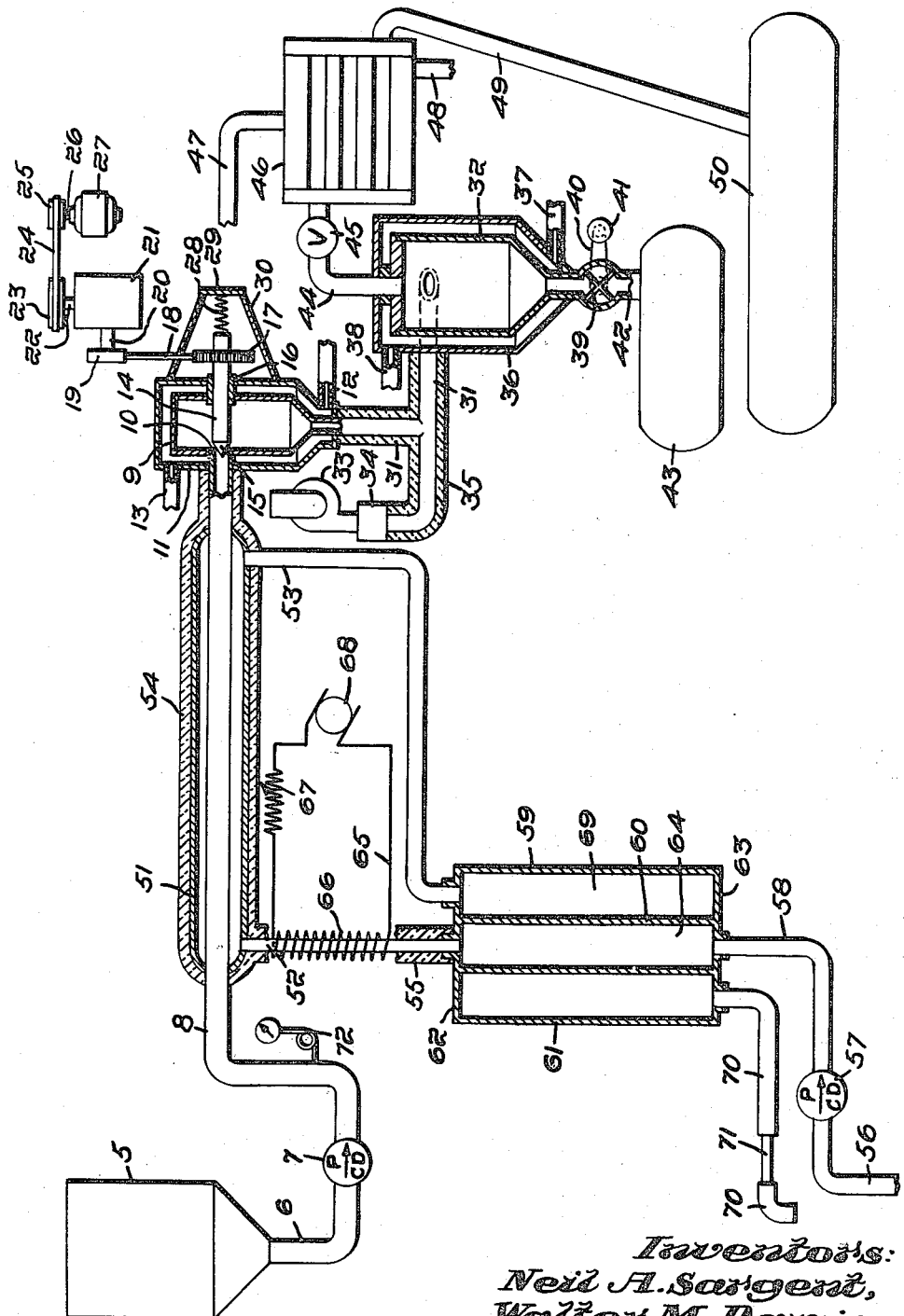
Inventors:
Neil A. Sargent,
Walter M. Davis,
by Richard W. Sternberg
Attorney United States Patent Office 2,868,280
Patented Jan. 13, 1959

2,868,280

METHOD FOR PRODUCING AEROGELS

Neil A. Sargent, Winchester, and Walter M. Davis, Jamaica Plain, Mass., assignors to Monsanto Chemical Company, St. Louis, Mo., a corporation of Delaware Application November 25, 1953, Serial No. 394,426

19 Claims. (Cl. 159—47)

The present invention relates to improved methods of making inorganic aerogels, and particularly to novel continuous methods of producing inorganic aerogels, and particularly silica aerogels. The present invention also relates to novel apparatus for the continuous production of inorganic aerogels.

It has been proposed, heretofore, in Kistler Patent No. 2,093,454 to prepare various organic aerogels and inorganic aerogels from organic organogels or inorganic organogels by means of a batch process in an autoclave, wherein the organic liquid phase of the organogel is removed from the organic or inorganic gel as a vapor without substantial shrinkage of the gel structure and the vapor is released from the autoclave. While this process provides satisfactory aerogels, considerable equipment and manpower is required to carry out this process, and, hence, the process is not particularly suitable for the commercial production of silica aerogels. Moreover, there is no description in this Kistler patent of a continuous process of producing silica aerogels. In this same Kistler patent, the patentee points out, in substance, on page 2, column 2, line 64ff, that silica aerogels cannot be produced from silica gels in which the liquid phase consists of water due to the solvent action of water on silica at high temperatures.

In accordance with the present invention, on the other hand, it is possible to prepare silica aerogels, continuously, at considerably reduced cost, from silica gels in which the liquid phase consists of an organic liquid, water and an organic liquid, or water per se.

It has also been proposed, heretofore, in the Marshall Patent No. 2,285,449, to prepare silica aerogels from silica-alcohol-water sols by means of a batch process in which the sols are heated in an autoclave to remove the liquid phase consisting of alcohol and water without substantially subjecting the sol to a compressive liquid-solid interface. While this process provides satisfactory silica aerogels, it requires the use of considerable manpower and considerable expensive equipment. Hence, this process, although suitable for the commercial production of silica aerogels, is not as economical as is desired. Moreover, this patent does not disclose a continuous process for producing silica aerogels.

In accordance with the present invention, on the other hand, it is possible to produce silica aerogels continuously, at a considerable reduction in cost over the Marshall process, from silica sols containing as the liquid phase either water or a solution of water and an organic liquid.

It is one object of this invention to continuously produce silica aerogels, cheaply and efficiently, from various types of silica gels and silica sols.

It is a further object of this invention to provide a novel apparatus for the continuous production of silica aerogels, cheaply and efficiently, by the use of various types of silica gels and silica sols.

Still further objects and advantages of this invention will become apparent from the following description when considered in connection with the accompanying drawing and the appended claims.

In the accompanying drawing, which forms a part of this specification, and in which like numerals are employed to designate like parts throughout the same, the single figure is a front elevation, partly in section, of a silica aerogel-producing device embodying the present invention.

In the drawing wherein, for the purpose of illustration, is shown a preferred embodiment of the present invention, the numeral 5 designates a metal vessel or other suitable vessel, which is capable or being heated or cooled, in which an inorganic aerogel precursor such as a silica sol or a slurry of silica gel is stored as feed material. Connected to this vessel, preferably near the bottom thereof, in communicative relationship therewith is a pipe 6, the other end of which is connected to the intake or input end of a high pressure, constant delivery, displacement pump 7 for pumping the silica gel slurry or silica sol from the vessel. A pressure resistant tube or pipe 8, which is heated by suitable means, hereinafter referred to, is connected at one end to the outlet or output end of the pump and the other end thereof is provided with suitable valving means to permit control of the pressure in the tube and to release solid and gaseous materials therefrom. The valving means may comprise a hot letdown valve of the conventional type. However, such let-down valves normally can not be used over extended periods of time in the apparatus of the present invention due to the accumulation of solids on the valve seats of such valves, and, accordingly it is preferred to employ a hot let-down valve of the type shown in the drawing. In such case the end of tube 8 is arranged to terminate in the side wall of a pressure resistant container 9 and is adapted to form an annular valve seat 10. The container is provided with a jacket 11 having an inlet pipe 12 and outlet pipe 13, and hot fluids or gases are supplied to the jacket to heat the container. Mounted substantially coincident with the longitudinal axis of the tube 8 and externally thereof is a valve stem 14 which is provided with a tapered portion 15 composed of a hard tough alloy such as tungsten carbide and adapted to seat in the valve seat and permit sealing or any degree of opening of the tube 8. The valve stem is supported in position by annular bearing 16, which is mounted in the wall of container 9 directly opposite the valve seat 10, and the valve stem is free to rotate within the bearing and to slide in either direction along the longitudinal axis of the bearing. Attached to the valve stem externally of the container is a circular gear 17 which engages a pinion (not shown) driven by shaft 18. This shaft is driven through gears in gear box 19 by means of shaft 20 which is in turn driven by a system of gears in gear box 21 by means of shaft 22 to which is attached a belt driven pulley 23. The pulley is caused to rotate by means of a belt 24 driven by pulley 25 attached to shaft 26 driven by electric motor 27.

In order to obtain the proper clearance between valve seat 10 and the tapered portion 15 of the valve stem, a spring 28 is attached to the other end of the valve stem 14, the other end of which spring abuts against the end portion 29 of a frusto conical shell 30, which is attached to the jacket 11, the shell having an opening therein for shaft 18. The spring is so constructed as to seat the tapered portion of the valve stem in the valve seat when the pressure in the tube 8 is below the operating pressure, but is sufficiently yielding at operating pressures to permit hot gases in the tube 8 to push the valve stem away from the valve seat to give a predetermined clearance which will maintain the desired operating pressure in tube 8 while permitting gases and solids to escape from the tube.

Although the specific hot let-down valve described above is suitable, a hot let-down valve of the type described specifically in the copending application of E. Saunders and F. L. Matthews, Serial No. 244,672, filed August 31, 1951, now abandoned, which application is assigned to the same assignee as the present application, may also be used.

The container 9 is provided with a heating means such as jacket 11 in order to prevent heat loss from the gases and solids released from tube 8, and is heated to a sufficiently high temperature to prevent the condensation of liquids in the vapor on the solids (silica aerogel particles) which would normally occur due to the cooling of such vapors on being released from the higher pressure in tube 8 to the lower pressure in container 9.

Connected to the bottom of the container 9 is an insulated pipe 31, the other end of which is connected to the top portion of a cyclone separator 32 and is mounted tangentially to the side wall of the separator. This pipe conveys the silica aerogel and vapors from the container 9 into the separator where separation of the silica aerogel particles and vapor is effected. Preferably, and particularly in those instances where the apparatus is employed to convert silica aquasols or aqueous slurries of silica hydrogel to an aerogel, means are provided to supply a heated gas such as heated air to container 9 of pipe 31 to prevent the condensation of steam vapors on the silica aerogel during the time the aerogel is in pipe 31 and separator 32. Such means comprise a blower 33 which blows air or some other gas through a heat exchanger 34 where the gas or air is heated and thence is blown through insulated pipe 35 which is connected to the container or to pipe 31 at some point between such container and separator, preferably near or adjacent the container. The separator is preferably heated by suitable means to prevent vapors therein from condensing on the aerogels or the walls of the separator. A suitable means comprises a heating jacket 36, which completely surrounds the separator, provided with an inlet pipe 37 through which heating fluid or gas is supplied, the gas or fluid circulating through the jacket and leaving the jacket by way of outlet pipe 38.

The separator is also provided with a means for releasing collected solid (silica aerogel) particles from the bottom thereof, a suitable means being a star valve 39 having a pulley (shown in dotted lines) driven by a belt 40 and a pulley (shown in dotted lines) driven by electric motor 41. The star valve, which may be caused to rotate continuously or intermittently, allows the solid particles to fall by gravity through a pipe 42 into a container or storage vessel 43.

The vapors from which the silica aerogel is separated in the separator move upwardly and leave the top of the container by way of a centrally positioned pipe 44 provided with a valve 45 which is open during normal operations. In those instances where the apparatus is employed to prepare silica aerogels from silica aquasols or aqueous slurries of silica hydrogel, the vapors may be vented directly to the atmosphere, if desired. However, in those instances where the silica aerogel is prepared from slurries of silica organogels or silica sols containing an organic liquid, the vapors in the separator contain the organic liquid in vapor form and it is preferred to provide means for recovering such liquid. Suitable means comprise a condenser 46 connected to pipe 44, the condenser being supplied with a suitable cooling medium such as water through pipe 47, which cooling medium leaves the condenser by way of outlet pipe 48. The condensed liquids leave the condenser by way of pipe 49 through which they run into container or storage vessel 50. The liquids may then be distilled, if necessary, to purify them.

Pipe 8 may be heated by any means which is capable of raising the temperatures of the silica sol or silica gel slurry therein near or above the critical temperature of the liquid phase in such slurry or sol. In those instances where the liquid phase contains an organic liquid having a critical temperature appreciably below that of water, it is possible to heat the tube electrically or by a direct flame, but such means may occasionally result in uneven heat transfer which may cause plugging of the tube. It is also possible to heat the tube by providing the tube with a jacket 51, preferably along the major length of the tube, having an inlet pipe 52 and an outlet pipe 53 by means of which hot liquids such as "Dowtherm," a molten lead bath, a molten sodium nitrate bath or the like, or hot gases such as steam or hot flue gases, may be circulated in contact with pipe 8. The jacket and those portions of tube 8 which may be exposed between the end of the jacket and the end of the tube are provided with insulation 54 to prevent excessive heat loss.

While it is possible to use similar heating means and heating media in those instances where the liquid phase of the silica sol or silica gel slurry consists of water, the above described heating media, with the exception of steam, have one or more disadvantages which limits their usefulness or makes them unsuitable. For example, Dowtherm cannot be used to obtain temperatures as high as the critical temperature of water, and it is difficult to control the temperature of the other heating media (except steam) uniformly at or above the critical temperature of water for the continuous production of silica aerogel. Even where steam is used as the heating media, it has presently been found to be preferable, in order to uniformly maintain the steam at the desired operating temperature and in order to minimize scale formation in the tube, to employ the heating means shown in the drawing. This heating means comprises the jacket 51 with insulation 54, inlet pipe 52 and outlet pipe 53, as referred to above, the inlet pipe 52 having insulation 55, and the heating means also comprises means for supplying steam to the jacket through pipe 52 at a controlled temperature. The latter means comprises a pipe 56 for conveying water from a source (not shown), which pipe is connected to the inlet or input end of a high pressure, constant delivery displacement pump 57. Numeral 58 designates a pipe, one end of which is connected to the outlet or output end of the pump, and the other end of which is connected to a heat exchanger designated generally by the numeral 59 where the water supplied by the pump is converted to steam. The heat exchanger shown comprises two concentric cylindrical members 60 and 61 closed at both ends by circular plates 62 and 63, and the pipe 58 communicates with the chamber 64 defined by member 60 and end plates 62 and 63. Heat is supplied to the heat exchanger by means described hereinafter. Pipe 52, hereinbefore referred to, communicates with the other end of chamber 64 and provides the means for conveying steam to jacket 51. In order to heat the steam to the desired temperature and to control the temperature of the steam uniformly, the pipe 52 is heated by any suitable controlled means such as flue gases or controlled electrical means. Suitable means for this purpose comprise a resistor wire 65 which is preferably wound around pipe 52 in the form of a coil 66, and is provided with a variable resistor 67 and a source of electrical current such as a generator 68.

The steam after entering the jacket 51, and thereby heating tube 8, leaves the jacket by way of pipe 53 which communicates with the outer chamber 69 of the heat exchanger 59, which outer chamber is defined by cylindrical members 60 and 61 and end plates 62 and 63, and thus serves as the heating medium in the heat exchanger to heat the water entering into chamber 64. Connected to the heat exchanger in communication with chamber 69 is a pipe 70 which is provided with a flow control orifice 71 having an opening adapted to maintain the desired pressure in pipes 52, jacket 51, pipe 53 and heat exchanger 59. Steam and/or condensed steam leave the chamber 69 through pipe 70 and the flow control orifice.

The tube 8 is preferably provided with a pressure gauge 72 for indicating the pressure in the tube.

The operation of the silica aerogel-producing device is as follows:

The tube 8 is first heated to a temperature which may be within the range from slightly below to above the critical temperature of the liquid phase of a silica sol or silica gel slurry which it is desired to convert to a silica aerogel. This is accomplished in the heating means shown in the drawing by first pumping water from a suitable source through pipes 56 and 58 by means of pump 57 into chamber 64 of heat exchanger 59 and finally through pipe 52. The heat exchanger need not be functioning at this stage, but, if desired, heat may be supplied to chamber 69 thereof by steam or hot flue gases from a suitable source (not shown) to heat the water in chamber 64. In any event heat is supplied to pipe 52 by means of the resistor wire 65 which is heated by electrical current supplied by generator 68 and controlled as to heat output by variable resistor 67. In this manner hot water and eventually steam are supplied to the jacket 51 which is conveyed to chamber 69 by pipe 53 and the water entering chamber 64 is preheated before reaching pipe 52. After a suitable period of time steam is obtained in jacket 51 at a temperature above the critical temperature of the silica sol or silica gel slurry which it is desired to convert to an aerogel. When such a temperature is reached and maintained by control of the electrical current and resistance, the inorganic aerogel precursor such as silica sol or silica gel slurry which is stored in vessel 5 is pumped from such vessel through pipe 6 and into tube 8 at a constant displacement by means of pump 7. When the starting material is a sol, it gels in the form of particles on reaching the heated portion of tube 8 and a turbulent flow of material is induced due to vaporization of the liquid phase. In the case of silica gel slurries no gel particles are formed but substantially the same material and turbulent flow is produced. As the material progresses through the tube due to the pressure of the vapor formed and the pressure of new feed material, the material is heated to a temperature varying from slightly below to above the critical temperature of the liquid phase in the material and the liquid therein is vaporized at a pressure such that the gel is not subjected to any substantial compressive liquid solid interface, that is, the gel structure of the initially formed gel is maintained without substantial shrinkage. The material is thus converted to a mixture of vapors and aerogel particles. As soon as the operating pressure in tube 8 is reached, the pressure of the vapors therein force the valve stem 14 away from the valve seat 10 a predetermined distance which is governed by the strength of spring 28 and the operating pressure desired. Until the operating pressure is reached the tapered portion 15 of the valve stem is seated in the valve seat 10 by the force of spring 28 and tube 8 is thereby sealed to allow the pressure to build up in the tube. As soon as vapor begins to escape from tube 8 by pushing back the valve stem, the valve stem is caused to rotate continuously by starting motor 27 which drives the pulley 25 fixed to shaft 26 thus causing the belt 24 to drive pulley 23 which in turn drives gear 17 fixed to valve 14 by a series of shafts 22, 20 and 18 and gears contained in gear boxes 21 and 19 and a pinion gear engaging gear 17.

The vapors and aerogel particles leaving tube 8 in the annular opening between valve seat 10 and the tapered portion 15 of the valve stem enter a heated container 9 which is heated by means of the jacket 11 through which is circulated a hot fluid or hot gas at a temperature sufficiently high to heat and maintain the vapors in container 9 above the temperature at which condensation of the vapors on the aerogel particles occurs. The heated vapors and aerogel leave container 9 by way of pipe 31 and enter tangentially into the top portion of a heated cyclone separator 32. In order to prevent the condensation of the vapors on the aerogel, in container 9 or in the passage of such substances from the container 9 to the cyclone separator and also while in the separator, a hot gas such as hot air is mixed with the vapors and the aerogel in container 9 or pipe 31. This hot gas when mixed with the vapors provides a mixture which is at a temperature above the temperature at which the vapors will condense on the aerogel particles, and is supplied by blowing a gas through heat exchanger 34 where the gas is heated to the desired temperature and thence through pipe 35 connected to pipe 31. In the separator the silica aerogel particles fall downwardly and collect in the bottom of the separator while the vapors rise upwardly and leave the separator by way of pipe 44. In order to prevent the condensation of the vapors in the separator on the walls of the separator and on the silica aerogel particles in the separator, heat is supplied to the vapors by heating the walls of the separator. This is suitably accomplished by supplying a heated fluid or gas to the jacket 36 of the separator at a temperature sufficient to heat or maintain the vapors in the separator to a temperature high enough to prevent such condensation.

The silica aerogel particles in the bottom of the separator 32 are released periodically or continuously from the separator by the periodic or continuous rotation of star valve 39 which is driven by pulleys and belt 40 by means of motor 41. The silica aerogel particles fall by gravity through pipe 42 into storage container 43 from which they may be removed periodically or continuously and then packaged or used. The silica aerogel particles obtained are in a very finely divided condition, the major portion of particles having a particle size below 15 microns and usually below 5 microns. Hence, the particles generally are suitable for most uses without need for comminution or grinding. This is an unexpected advantage which could not be foreseen from the nature of the device described herein.

The vapors leaving the separator through pipe 44 may be condensed if it is desired to recover organic liquids therefrom by passing the vapors into a condenser 46 where they come into contact with surfaces cooled by water or a refrigerant which enters the condenser through pipe 47 and leaves by pipe 48. The condensed vapor runs from the condenser through pipe 49 into a storage container 50. The liquid in this container may be purified, if desired, by a conventional method such as distillation or the like.

In carrying out the processes of this invention, the silica sols or silica gel slurries are continuously passed into a heated zone and are heated under conditions of turbulent flow to a temperature varying from slightly below to above the critical temperature of the liquid phase of the sol or slurry, preferably below 500° C., while maintaining the pressure above the critical pressure of such liquid phase without subjecting the material in the zone to a substantial compressive liquid-solid interface, thereby converting the liquid phase of the sol or slurry to a vapor without substantial shrinkage of the gel structure. In the case where a silica gel slurry is employed the gel structure referred to is the gel structure of the gel in the slurry, whereas in the case of silica sols the gel structure referred to is that of the gel formed in the zone during the heating of the sol. The gel structure obtained by the heating is that of an aerogel in which the liquid phase of the starting gel has been replaced by a gas or vapor without substantial shrinkage of the starting gel. It is thus seen that the initial silica sol or silica gel slurry is heated in the zone until it is converted to an aerogel and a vapor. During the passage of the sol or gel slurry through the heated zone the sol or slurry forms particles of aerogel. These particles are continuously released together with vapor from this zone into another heated zone which is at a pressure between about 1 and 2 atmospheres of pressure absolute and is maintained at a temperature above the temperature at which condensation of the vapor on the silica aerogel occurs but about 50° F. below the critical temperature of the vaporized liquid, and the particles of silica aerogel are separated from the vapor while the vapor is maintained at or above such temperature. The separated silica aerogel is obtained in a finely divided condition with the bulk of the particles having a particle size below 15 microns. The resulting aerogels are particularly suitable for use as flatting agents in clear coating compositions, and as thickening agents particularly for thickening mineral lubricating oils to the consistency of grease.

The fact that the silica aerogel is obtained in an extremely finely divided condition instead of as a large mass is quite unexpected in view of the tendency of silica gel slurries or silica sols to form large gel masses when heated. Thus, it is quite unexpected that silica aerogel could be continuously produced in a small heated zone such as in tube 8 without almost immediate plugging of such zone or tube. Even if the heating were carried out in a large heated zone, it could not be expected that anything but a relatively large mass of silica aerogel which could not be discharged from the zone would be obtained, whereas by carrying out the processes of this invention the silica aerogel is obtained as a fine powder which is readily released from the heating zone.

In carrying out the processes of this invention it is possible to start with a wide variety of silica aerogel precursors, that is, silica sols or slurries of silica gels which are capable of being converted to silica aerogels. For example, it is possible to employ substantially anhydrous silica organosols which consist essentially of colloidal silica particles dispersed in an organic liquid, preferably an organic liquid which has a critical temperature below that of water. As examples of such sols may be mentioned silica-alcosols as, for example, silica-methanol sols, silica-ethanol sols, silica-propanol sols, silica-butanol sols and the like; silica-organic ester sols as, for example, silica-ethyl acetate sols, silica-butyl acetate sols and the like; silica-aliphatic hydrocarbon sols as, for example, silica-lactol spirits sols, silica-octane sols and the like; and silica-aromatic hydrocarbon sols such as silica-benzene sols, silica-toluene sols and the like. Such sols, methods of preparing such sols and organic liquids comprising the liquid phase of such sols are described in greater detail in the patent to Morris D. Marshall, No. 2,386,247, granted October 9, 1945. Of these sols, the silica-alcosols, and particularly the silica methanol sols and silica-ethanol sols are preferred for use in the processes of the present invention because the liquids in such sols do not carbonize as readily as other organic liquids and thus yield a purer aerogel product than is generally the case with other silica organosols. The silica content of the silica-organosols may vary somewhat, but is preferably within the range of about 4 to 12% by weight. The bulk density of the silica aerogels prepared from such sols increases with increasing silica content of the sols. The silica organosols are substantially free of electrolytes and generally contain less than 1.5% of electrolytes.

It is also possible in accordance with the present invention to employ silica-organoaquasols, that is, sols which consist essentially of colloidal silica dispersed in a homogeneous solution of water and a water-miscible organic liquid, preferably an organic liquid having a critical temperature substantially below the critical temperature of water. As examples of suitable water-miscible organic liquids may be mentioned water-miscible alcohols such as methanol, ethanol, propanol, isopropanol and the like; water-miscible ketones such as acetone, methyl ethyl ketone, diethyl ketone and the like; water-miscible Cellosolves such as methyl, ethyl or butyl Cellosolves and the like. Such sols, methods of preparing the sols and water-miscible organic liquids employed in such sols are described in greater detail in the patent to Morris D. Marshall, No. 2,285,449, granted June 9, 1942. In order to prepare suitable aerogels from such sols by the continuous process described herein, it is desirable to employ silica organo-aquasols containing from about 50 to 99% by weight of water-miscible organic liquid, the remainder of the liquid phase consisting of water. For best results and for economical considerations, it is preferred to employ silica-organo-aquasols the liquid phase of which consists of about 30 to 50% by weight of water and from about 70 to 50% by weight of the water-miscible organic liquid. The silica content of such sols may vary to some extent but is preferably from about 4 to 12% by weight. The electrolyte content of such sols is not critical and may vary from about 0.001 to 2% by weight. The preferred sols of this class are the silica alco-aquasols in which the liquid phase consists of water and a water-miscible alcohol, preferably methanol or ethanol, having a critical temperature substantially below that of water.

It is also possible in accordance with the present invention to employ acidic silica aquasols which are free or substantially free of metallic cations. These sols which consist essentially of colloidal silica dispersed in acidic water may be prepared in various ways. One method of preparation comprises passing a water-soluble alkali metal silicate through a bed of cation-exchange material operating on a hydrogen cycle until an acidic silica aquasol which is substantially free of metallic cations, that is, contains less than 0.001% by weight of metallic cations, is obtained. In general, this result may be achieved by collecting that portion of the effluent which is obtained before the break through point of the bed is reached. The break through point is reached when the bed fails to adsorb the metallic cations from the silicate passing through the bed. The pH of the collected effluent or ion-exchange sol is quite critical and should not be appreciably below 1.5 or above 3. However, best results are obtained in the continuous production of aerogels when the ion exchange sol has a pH between about 2 and 2.5, and accordingly such sols are preferred. In preparing aquasols of this type, it is desirable to employ a silicate solution which will provide a final sol having a minimum silica content of about 5%. The maximum silica content may be as high as 15%, but in practice it is difficult to obtain a sol having a silica content above 9%, even when silicates of special $Na_2O$ to $SiO_2$ ratios are used or refrigeration of the silicate solution is resorted to, due to gel formation in the cation exchange bed. The preparation of silica aquasols of the type described above is also described in the co-pending application of John F. White and William S. Wilson, Serial No. 382,184, filed September 24, 1953, which application is assigned to the same assignee as the present application.

Another method of preparing a silica aquasol which is substantially free of metallic cations, that is, contains less than 0.001% by weight of metallic cations, which method is also described in the co-pending application referred to immediately above, comprises first mixing a water-soluble silicate such as sodium silicate with a mineral acid such as sulfuric, hydrochloric or phosphoric acid to provide a sol having a pH between about 2 and 4. The sol may have a silica content between about 5 and 15% and preferably between 6 and 10%. This sol is then cooled to a temperature which may range from just above the freezing point to about 10° C., or may be prepared at such temperatures to precipitate a substantial part of the electrolyte, for example, sodium sulfate, sodium chloride or sodium phosphate, formed by the reaction of the silicate and the acid. The precipitated electrolyte is then removed from the sol by filtration or centrifugation or the like, after which the sol is passed through a bed of cation-exchange material operating on the hydrogen cycle to remove metallic cations from the sol. If desired, the sol may then be passed through a bed of anion-exchange material to remove anions from the sol, but this step is not essential provided the pH of the sol is at least 1.5.

It is also possible to employ slurries of various silica gels in the processes of this invention. Such slurries should be sufficiently fluid to be pumped, and may contain varying amounts of silica gel particles and various types of liquids as the liquid phase. One suitable type of slurry is a slurry of a silica organogel in an organic liquid which is the same as the liquid phase of the organogel, and the organic liquid is preferably one having a critical temperature below that of water. As examples of such slurries may be mentioned slurries of silica-alcogels in which the liquid phase is methanol, ethanol, propanol, isopropanol or the like, in an alcohol which is the same as the alcohol in the liquid phase of such gel; slurries of silica-aliphatic hydrocarbon gels in which the liquid phase is lactol spirits, octane or the like, in an aliphatic hydrocabon which is the same as the aliphatic hydrocarbon in the liquid phase of such gel; slurries of silica-aromatic hydrocarbon gels in which the liquid phase is benzene, toluene or the like, in an aromatic hydrocarbon which is the same as the aromatic hydrocarbon in the liquid phase of such gel; and slurries of silica-ketone gels in which the liquid phase is acetone, diethyl ketone or the like, in a ketone which is the same as the ketone in the liquid phase of such gel. Silica organogels of the type described above and other silica organogels are disclosed in the Kistler Patent No. 2,093,454 hereinbefore referred to, and such organogels are slurried with an organic liquid which is the same as the liquid phase of the organogel to provide the starting material for the processes of this invention. In general, the silica organogels are prepared by first making a silica hydrogel in the customary manner and then replacing the water in the hydrogel with a water-miscible organic liquid which may be the liquid desired in the starting slurry or such water-miscible organic liquid may in turn be replaced by one or more organic liquids until an organogel having a liquid phase of the desired composition is obtained. More detailed methods of preparing silica organogels are given in Kistler Patent No. 2,093,454.

The electrolyte content of the slurries of silica organogels is not too critical, but in general such slurries usually contain less than 2% by weight of electrolyte. The silica content of the gel may vary to some extent depending on the viscosity of the slurry and the desired bulk density of the aerogel obtained. In general, the silica content of the silica organogel may be between about 8 and 20% by weight and the silica content of the slurry may be between about 4 and 12% by weight. For most purposes, a suitable slurry will comprise from about 30 to 70% by weight of gel and from about 70 to 30% by weight of slurry liquid (liquid other than the liquid in the gel) provided the slurry is capable of being pumped. The preferred slurries of silica organogels are slurries of silica alcogels in an alcohol which is the same as the alcohol in the liquid phase of the gel, and preferably slurries of silica-methanol gels in methanol or silica-ethanolgels in ethanol.

It is also possible to use, in the processes of this invention, a slurry of a silica organo-aquagel in a mixture of water and a water-miscible organic liquid which is the same as the organic liquid in the liquid phase of such gel. Thus, it is possible to use a slurry of a silica alco-aquagel in which the liquid phase of the gel consists of water and a water-miscible alcohol such as methanol, ethanol, propanol or the like, in a mixture of water and the same alcohol which is present in the gel; or slurries of a silica ketone-aquagel in which the liquid phase of the gel consists of water and a ketone such as acetone, diethyl ketone or the like, in a mixture of water and the same ketone which is present in such gel; or slurries of a silica methyl Cellosolve-aquagel in a mixture of water and methyl Cellosolve; slurries of a silica ethyl Cellosolve-aquagel in a mixture of water and ethyl Cellosolve; slurries of a silica butyl Cellosolve-aquagel in a mixture of water and butyl Cellosolve, or the like. Such slurries may be prepared, for example, by first preparing a silica hydrogel in a conventional manner, washing the hydrogel with water, washing the hydrogel with a solution of water and a water-miscible organic liquid until part of the water in the gel has been replaced by such solution and then slurrying the gel in such solution. In preparing such slurries it is preferred to wash the gel substantially free of electrolytes and to replace at least 50% by weight of the water in the hydrogel with the water-miscible organic liquid. The slurry liquid preferably contains the same percentage of water-miscible organic liquid as the liquid phase of the gel.

The electrolyte content of the slurries of silica organo-aquagels is not particularly critical, particularly when the slurries contain at least 50% of the water-miscible organic liquid in which case an electrolyte content of less than 2% by weight is permissible. However, when the water content of the slurry is increased, the electrolyte content becomes more critical and should be decreased down to 0.0015% by weight or less as the water-miscible organic liquid content of the slurry approaches zero. As in the case of the slurries of silica organogels, the silica content of the silica organo-aquagels may vary to some extent depending on the bulk density desired in the aerogel prepared from the slurry. In general, the silica content of the silica organo-aquagel may be between about 8 and 20% by weight and the silica content of the slurry may be between about 4 and 10% by weight. A suitable slurry will usually comprise from about 30 to 70% by weight of gel and from about 70 to 30% by weight of slurry liquid provided the slurry can be pumped. The preferred slurries of silica organo-aquagels are slurries of silica alco-aquagels in which the liquid phase of the gel contains at least 50% by weight of a water-miscible monohydric alcohol having a critical temperature below that of water, in a mixture of water and a water-miscible monohydric alcohol which is the same as that in the liquid phase of the gel and which alcohol is present in the slurry liquid in substantially the same weight ratio as it is present in the liquid phase of the gel.

The preferred slurries of silica gels for use in the processes of this invention are slurries of silica aquagels in water. Suitable slurries of this type may be prepared in various ways, but it is essential that the slurry used be free or substantially free of metallic cations, that is, contain less than 0.001% by weight of metallic cations, otherwise a chalky, inferior product is obtained. One suitable method of preparing such a slurry comprises first forming a silica hydrogel from a water-soluble silicate and an acid in the usual manner, washing the hydrogel with distilled water or demineralized water equivalent in purity to distilled water until the hydrogel is substantially free of metallic cations, and then forming a slurry of the washed hydrogel in distilled water or demineralized water of equal purity. For best results in the continuous production of silica aerogels from such slurries it is preferred to acidify the slurry with an acid to a pH not less than 1.5 prior to use.

Another method of preparing suitable slurries of silica aquagels in water comprises first forming a silica hydrogel from a water-soluble silicate and an acid in the usual manner, washing the hydrogel with acidified water, preferably water containing less than 300 parts per million of inorganic matter, at a pH between about 1.5 and 3.0 until the hydrogel is substantially free of metallic cations and metals combined with silica, and then forming a slurry of the washed hydrogel in acidic water at a pH of about 1.5 to 3.5.

The preparation of silica hydrogels which are substantially free of metallic cations and the preparation of aerogels therefrom by a batch process wherein the hydrogel is heated in an autoclave is described and claimed in the co-pending application of John F. White and William S. Wilson, Serial No. 382,184, filed September 24, 1953, which application is assigned to the same assignee as the present application.

The silica content of the hydrogel in the aqueous hydrogel slurry may vary considerably depending on the bulk density desired in the aerogel prepared from the slurry. In general, the silica content of the silica hydrogel may be between about 8 and 20% by weight and the silica content of the slurry may be between about 5 and 10% by weight. A suitable slurry will usually comprise from about 30 to 65% by weight of gel and from about 70 to 35% by weight of water other than the water in the gel. It is preferred to use a minimum of water to form the slurry consistent with obtaining a pumpable slurry in order to convert the slurry to an aerogel and steam with a minimum heat input, and in some instances it is possible to use a slurry containing about 70% by weight of hydrogel and 30% by weight of water.

It is preferred to use the slurries of silica hydrogel in water over other silica aerogels precursors such as silica sols, silica organogel slurries or silica organo-aquagel slurries in the processes of this invention because the aerogels can be produced more cheaply and more efficiently from the aqueous slurries of silica hydrogel than from other silica aerogel precursors.

The processes of this invention are not restricted to the continuous production of silica aerogels, but are also applicable to the continuous production of other inorganic aerogels from a wide variety of inorganic aerogel precursors such as slurries of the inorganic gels described in Gistler Patent No. 2,093,454 or the inorganic sols described therein as being suitable for aerogel production by a batch process.

In carrying out the continuous conversion of the gel slurries or sols described herein, the temperature and pressure used is governed by the particular liquids which make up the liquid phase of the slurries, the gels or the sols since the critical temperature and critical pressure of such liquids vary widely. As is pointed out previously herein the temperature used should be from slightly below to above the critical temperature of the liquid phase of the feed material, but preferably should not exceed 500° C. This means that the liquid phase of the feed material should preferably have a critical temperature below 500° C., and for ease of operation, it is preferred that the liquid phase of the feed material should have a critical temperature between about 100 and 400° C. The pressure used must be above the critical pressure but the upper limit is governed only by the strength of the apparatus used. However, it is preferred to operate at pressures below 10,000 pounds per square inch absolute.

The rate of feed of the aerogel precursor through the heated zone need not be entirely constant, and may be high or low depending on the apparatus used and the amount of heat which is supplied to maintain the heated zone at the operating temperature. It is preferred, however, to maintain a high rate of feed as possible consistent with the foregoing as this makes for improved turbulent flow and finely divided aerogels, and more economical operation.

A further understanding of the processes of this invention will be obtained from the following specific examples which are intended to illustrate the invention, but not to limit the scope thereof, parts and percentages being by weight unless otherwise specified.

*Example I*

An acidic silica alco-aquasol containing 50% ethanol and 50% water as the liquid phase and having a pH of about 3.6, a colloidal silica content of 9% and a sodium sulfate content of 1% was pumped continuously at the rate of 2 gallons per hour into a jacketed stainless steel (type 316) tube 5 feet long and having an internal diameter of $5/16$ inch (such as tube 8), which tube was maintained at a temperature of 275° C. which was above the critical temperature, by the electrical heating means and heat exchanger 59 shown in the drawing and previously described herein. During the passage of the sol through the tube, the sol was first converted to a gel and finally to aerogel particles and vapor. The pressure in the tube was allowed to rise to a pressure of about 1900 pounds per square inch gauge, which is above the critical pressure of the liquid, after which vapor and aerogel particles were allowed to escape continuously from the tube by means of a valve, such as valve seat 10 and the rotating tapered valve stem 14 shown in the drawing, while maintaining the pressure in the tube substantially constant by controlling the opening between the valve seat and the tapered portion of the valve stem. The vapors and silica aerogel were thus continuously discharged at a pressure of about one atmosphere absolute into a heated zone, such as container 9, which zone was maintained at a temperature of about 110° C. to prevent the condensation of $H_2O$ and ethanol in the vapor on the silica aerogel particles, after which the vapors and silica aerogel particles were separated in a cyclone separator while maintaining the temperature of the vapors at about 110° C. The vapors were condensed to obtain a solution of water and ethanol, while the silica aerogel particles were collected and stored in a container. The silica aerogel thus produced was comparable in quality to a product produced by the batch process in which the sol is heated in an autoclave as described in the Marshall Patent No. 2,285,449, but was in the form of finely divided particles having an average particle size below 15 microns, whereas the product produced by a batch product is obtained as a mass which must be comminuted in an air mill before particles of comparable size are obtained.

*Example II*

A silica aerogel was produced continuously according to the procedure described in Example I with the exception that a silica alcosol containing substantially all ethanol as the liquid phase and having a pH of about 3.0, a colloidal silica content of about 10% and a sodium sulfate content of about 0.5% was used instead of the silica alco-aquasol of Example I. The silica aerogel particles obtained were comparable in quality and size to the silica aerogel particles obtained by the process of Example I.

*Example III*

A silica aquasol free of metallic cations and having a pH of 2.0 and a colloidal silica content of 5%, prepared by passing an aqueous sodium silicate solution containing 7% $SiO_2$ and 2.1% $Na_2O$ through a bed of acid regenerated cation-exchange material and collecting the effluent having a pH of 2.0, was continuously converted to a silica aerogel using the procedure described in Example I, with the exceptions that the feed rate was 1.5 gallons per hour, the tube was maintained at a temperature of 425° C., the pressure in the tube was maintained at 3500 pounds per square inch (gauge) and the discharged vapors and aerogel particles were continuously mixed with air at a temperature of 150° C. using 3 cubic feet of air per cubic foot of vapor to prevent the condensation of water in the vapor on the silica aerogel particles. The product obtained was almost comparable in quality and particle size to the silica aerogel product of Example I, but had a lower bulk density due to the lower silica content of the starting sol.

Example IV

A silica aquagel containing 15% SiO$_2$, sulfuric acid and sodium sulfate, obtained by the reaction of an aqueous sodium silicate solution and a sulfuric acid solution, was allowed to synerize for 24 hours at room temperature, after which the gel was broken up into lumps of about 3 inch size. The gel lumps were washed with natural water having a hardness of 20 parts per million, calculated as calcium carbonate, and acidified to a pH of 2 with sulfuric acid for a period of 44 hours after which time the gel was free of metallic cations and was also free of metals combined with silica. The gel lumps were then crushed through a 4 mesh sieve and slurried at high speed agitation with sufficient natural water having a hardness of 20 parts per million, calculated as calcium carbonate, and acidified to a pH of 2 with sulfuric acid to provide a slurry having a silica content of about 8%.

The resulting slurry, which has the consistency of an emulsion, was pumped continuously at the rate of 1.5 gallons per hour into a jacketed stainless steel (type 316) tube 5 feet long and having an internal diameter of 5/16 inch (such as tube 8), which tube was maintained at a temperature of 425° C., which is above the critical temperature of water, by the electrical heating means and heat exchanger 59 shown in the drawing and previously described herein. During the passage of the slurry through the tube it is converted to an aerogel and steam. The pressure in the tube was allowed to rise to 3500 pounds per square inch (gauge) which is above the critical pressure of water, after which steam and aerogel particles were allowed to continuously escape from the tube through a valve comprising valve seat 10 and the rotating tapered valve stem 14 shown in the drawing, while maintaining the pressure in the tube substantially constant by controlling the opening between the valve seat and the tapered portion of the valve stem. The steam and the silica aerogel particles were thus continuously discharged at a pressure of about one atmosphere absolute into a heated zone, such as container 9, which zone was maintained at a temperature of about 160° C. to prevent the condensation of water on the silica aerogel particles. The steam and aerogel particles were then immediately mixed with air at a temperature of 200° C. using 3 cubic feet of air per cubic foot of steam, and this mixture was then separated in a cyclone separator while maintaining the vapors at 150° C. The vapors leaving the separator were then vented to the atmosphere, while the silica aerogel particles were collected and stored. The silica aerogel product obtained was of good quality and was in the form of fine particles having an average particle diameter below 15 microns.

Example V

A silica aerogel was produced continuously according to the procedure set forth in the second paragraph of Example IV except that a slurry of a silica alcogel, prepared by replacing the water in the washed hydrogel of the first paragraph of that example with ethanol, and slurrying the resulting ethanol gel in ethanol using sufficient ethanol to provide a slurry containing 8% SiO$_2$ was employed and with the further exception that the tube was heated at 375° C. using a pressure of about 1800 pounds per square inch (gauge) in the tube.

The product obtained was comparable to that of Example II, but the process could be operated considerably longer without the formation of scale in the tube.

What is claimed is:

1. A continuous process of producing inorganic aerogels which comprises continuously feeding under pressure a liquid, inorganic-aerogel precursor containing a liquid phase having a critical temperature below 500° C. into a heated zone which is heated to maintain it at a temperature varying from about the critical temperature of the liquid phase in said precursor up to but not in excess of 500° C., whereby as a result of said feeding step and the formation of vapors from said liquid phase a state of turbulent flow is produced, continuously heating said precursor in said heated zone while in said state of turbulent flow at a pressure above the critical pressure of the liquid phase of the precursor until said precursor is converted to vapors and aerogel particles and continuously flowing said vapors and aerogel particles at the aforesaid temperature and pressure from the first heated zone into a second heated zone maintained at a temperature above the temperature at which condensation of the vapors on the aerogel occurs and at a pressure between about 1 and 2 atmospheres of pressure absolute and thereafter separating the vapors from the aerogel particles at a temperature above the temperature at which said vapors condense on said aerogel particles.

2. A continuous process as in claim 1, but further characterized in that said liquid, inorganic-aerogel precursor is a liquid, silica-aerogel precursor.

3. A continuous process of producing silica aerogels which comprises continuously feeding under pressure a silica organosol containing an organic liquid having a critical temperature below 500° C. into a heated zone which is heated to maintain it at a temperature varying from about the critical temperature of the liquid phase of said sol up to but not in excess of 500° C., whereby as a result of said feeding step and the formation of vapors from said organic liquid a state of turbulent flow is produced, continuously heating said sol in said heated zone while in said state of turbulent flow at a pressure above the critical pressure of the organic liquid in said sol until said sol is converted to vapors and aerogel particles and continuously flowing said vapors and aerogel particles at the aforesaid temperature and pressure from the first heated zone into a second heated zone at a temperature above the temperature at which condensation of the vapors on the aerogel occurs and at a pressure between about 1 and 2 atmospheres of pressure absolute and thereafter separating the vapors from the aerogel particles at a temperature above the temperature at which said vapors condense on said aerogel particles.

4. A continuous process as in claim 3, but further characterized in that said silica organosol is a silica alcosol containing from about 4 to 12% by weight of silica.

5. A continuous process of producing silica aerogels which comprises continuously feeding under pressure a silica aquasol which is substantially free of metallic cations into a heated zone which is heated to maintain it at a temperature varying from about the critical temperature of water up to but not in excess of 500° C., whereby as a result of said feeding step and the formation of steam from said aquasol a state of turbulent flow is produced, continuously heating said aquasol in said heated zone while in said state of turbulent flow at a pressure above the critical pressure of the water in said aquasol until said aquasol is converted to steam and aerogel particles and continuously flowing said steam and aerogel particles at the aforesaid temperature and pressure from the first heated zone into a second heated zone at a temperature above the temperature at which steam condenses on said aerogel particles and at a pressure between about 1 and 2 atmospheres of pressure absolute and thereafter separating the steam from the aerogel particles at a temperature above the temperature at which steam condenses on said aerogel particles.

6. A continuous process as in claim 5, but further characterized in that the steam and aerogel particles released into the second heated zone are blended with heated air to form a mixture of air and steam which is at a temperature above the temperature at which the steam in said mixture condenses on said aerogel particles.

7. A continuous process as in claim 5, but further characterized in that said aquasol has a silica content of about 5 to 9% by weight.

8. A continuous process of producing silica aerogels which comprises continuously feeding under pressure a slurry of silica hydrogel, which is substantially free of metallic cations, in water into a heated zone which is heated to maintain it at a temperature varying from about the critical temperature of water up to but not in excess of 500° C., whereby as a result of said feeding step and the formation of steam from said slurry a state of turbulent flow is produced, continuously heating said slurry in said heated zone in said state of turbulent flow at a pressure above the critical pressure of water until said slurry is converted to steam and aerogel particles and continuously flowing said steam and aerogel particles at the aforesaid temperature and pressure from the first heated zone into a second heated zone at a temperature above the temperature at which steam condenses on said aerogel particles and at a pressure between about 1 and 2 atmospheres of pressure absolute and thereafter separating the steam from the aerogel particles at a temperature above the temperature at which steam condenses on said aerogel particles.

9. A continuous process as in claim 8, but further characterized in that the steam and silica aerogel particles released into the second heated zone are blended with heated air to form a mixture of air and steam at a temperature above the temperature at which steam in said mixture condenses on said aerogel particles.

10. A continuous process as in claim 8, but further characterized in that the silica hydrogel in said slurry has a silica content of about 8 to 20% by weight, and the silica content of the slurry is between about 5 and 10% by weight.

11. A continuous process of producing silica aerogels which comprises continuously feeding under pressure a slurry of a silica organo-aquagel having a liquid phase comprising water and a water-miscible organic liquid having a critical temperature below 500° C. in a mixture of water and said organic liquid, into a heated zone which is heated to maintain it at a temperature varying from about the critical temperature of the liquid phase of said slurry up to but not in excess of 500° C., whereby as a result of said feeding step and the formation of vapors from said liquid phase a state of turbulent flow is produced, continuously heating said slurry in said heated zone while in said state of turbulent flow at a pressure above the critical pressure of said liquid phase until said slurry is converted to vapors and aerogel particles and continuously flowing said vapors and aerogel particles at the aforesaid temperature and pressure from the first heated zone into a second heated zone at a temperature above the temperature at which said vapors condense on said aerogel particles and at a pressure between about 1 and 2 atmospheres of pressure absolute and thereafter separating the vapors and aerogel particles at a temperature above the temperature at which said vapors condense on said aerogel particles.

12. A process as in claim 11, but further characterized in that the slurry is a slurry of silica alco-aquagel having a liquid phase comprising water and a water-miscible alcohol having a critical temperature below that of water in a mixture of water and the same alcohol.

13. A continuous process of producing silica aerogels which comprises continuously pumping a liquid, inorganic-aerogel precursor in which the liquid phase has a critical temperature below 500° C., under pressure into one end of a tube which is heated to maintain it at a temperature above the critical temperature of the liquid in said precursor but not in excess of 500° C., continuously heating said precursor in said tube at a pressure above the critical pressure of the liquid phase of the precursor until the precursor is converted to vapors and aerogel particles and continuously flowing said vapors and aerogel particles at the aforesaid temperature and pressure from the other end of said tube at a rate sufficient to maintain the pressure in said tube above the critical pressure of said liquid phase into a second heated zone which is at a temperature above the temperature at which the vapors condense on the aerogel particles and at a pressure between about 1 and 2 atmospheres pressure absolute and thereafter separating the vapors from the aerogel particles at a temperature above the temperature at which the vapors condense on said aerogel particles.

14. A process as in claim 13, but further characterized in that said precursor is a liquid, silica-aerogel precursor.

15. A process as in claim 13, but further characterized in that said precursor is a slurry of silica hydrogel, which is substantially free of metallic cations, in water.

16. A continuous process of producing silica aerogels which comprises continuously pumping a silica organo-aquasol having a liquid phase comprising water and a water-miscible organic liquid, which liquid phase has a critical temperature below 500° C., under pressure into one end of a tube which is heated to maintain it at a temperature above the critical temperature of said liquid phase but not in excess of 500° C., continuously heating said organo-aquasol in said tube at a pressure above the critical pressure of said liquid phase until said organo-aquasol is converted to silica aerogel particles and vapors and continuously flowing said vapors and aerogel particles at the aforesaid temperature and pressure from the other end of said tube at a rate sufficient to maintain the pressure in the tube above the critical pressure of the liquid phase into a heated zone at a temperature above the temperature at which the vapors condense on the aerogel particles and at a pressure between about 1 and 2 atmospheres of pressure absolute, and thereafter separating the vapors from the aerogel particles at a temperature above the temperature at which said vapors condense on said aerogel particles.

17. A continuous process as in claim 16, but further characterized in that said silica organo-aquasol contains a liquid consisting of about 50% by weight and up of a water-miscible alcohol having a critical temperature below that of water, the remainder of the liquid phase being water, and from about 4 to 12% by weight of silica.

18. A process as in claim 17, but further characterized in that said alcohol is methanol.

19. A process as in claim 17, but further characterized in that said alcohol is ethanol.

References Cited in the file of this patent

UNITED STATES PATENTS

| | | |
|---|---|---|
| 1,251,295 | Sherwin | Dec. 25, 1917 |
| 1,677,986 | Poindexter et al. | July 24, 1928 |
| 2,093,454 | Kistler | Sept. 21, 1937 |
| 2,230,196 | Clayton | Jan. 28, 1941 |
| 2,249,767 | Kistler | July 22, 1941 |
| 2,285,449 | Marshall | June 9, 1942 |
| 2,429,964 | Schopmeyer et al. | Oct. 28, 1947 |
| 2,572,321 | Deanesly | Oct. 23, 1951 |
| 2,588,853 | Kummins et al. | Mar. 11, 1952 |
| 2,710,057 | Basset et al. | June 7, 1955 |

FOREIGN PATENTS

| | | |
|---|---|---|
| 667,359 | France | Oct. 16, 1929 |